United States Patent [19]
Rath

[11] 3,899,985
[45] Aug. 19, 1975

[54] METHOD AND APPARATUS FOR PLANTING PLANTS

[76] Inventor: Karl Friedrich Rath, Farrach 1, A-9422 Maria Rojach, Catinthia, Austria

[22] Filed: Oct. 18, 1973

[21] Appl. No.: 407,584

[30] Foreign Application Priority Data
Nov. 6, 1972 Austria .................. 9423/73

[52] U.S. Cl. .................................................. 111/3
[51] Int. Cl.² ................................... A01C 11/00
[58] Field of Search ......................... 111/2, 3

[56] References Cited
UNITED STATES PATENTS

| | | | |
|---|---|---|---|
| 602,894 | 4/1898 | Cheeseman | 111/3 |
| 653,298 | 7/1900 | King | 111/3 |
| 2,625,122 | 1/1953 | Carelock | 111/3 |
| 2,944,495 | 7/1960 | Wilson et al. | 111/2 |
| 2,960,944 | 11/1960 | Poll | 111/2 |
| 3,094,082 | 6/1963 | Wilson | 111/2 |

Primary Examiner—Stephen C. Pellegrino
Attorney, Agent, or Firm—Kurt Kelman

[57] ABSTRACT

A soil-penetrating tool including releasable clamping means carrying the roots of a plant is introduced at an oblique angle, preferably along a circular path, into the soil, and moved there into a position wherein the plant roots are separated from the tool by releasing the clamping means. The tool is then moved out of the soil.

9 Claims, 8 Drawing Figures

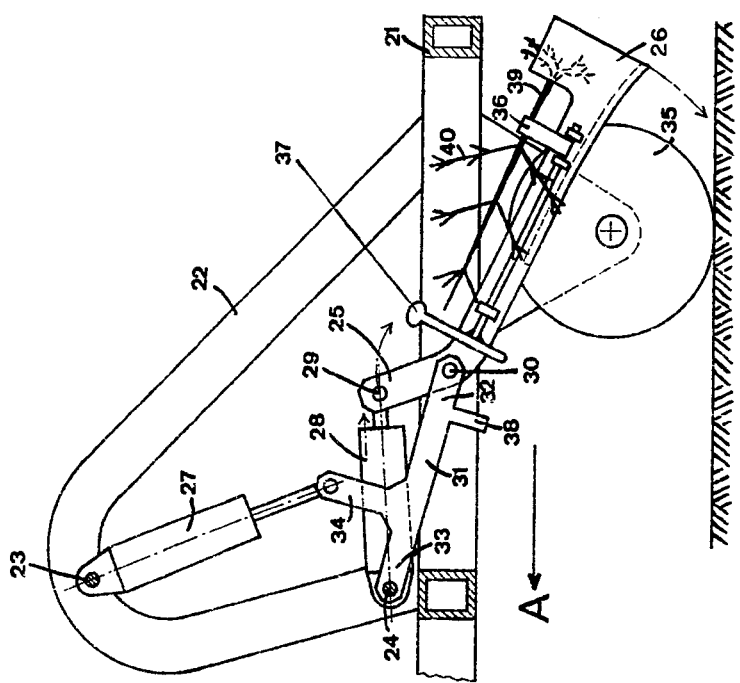
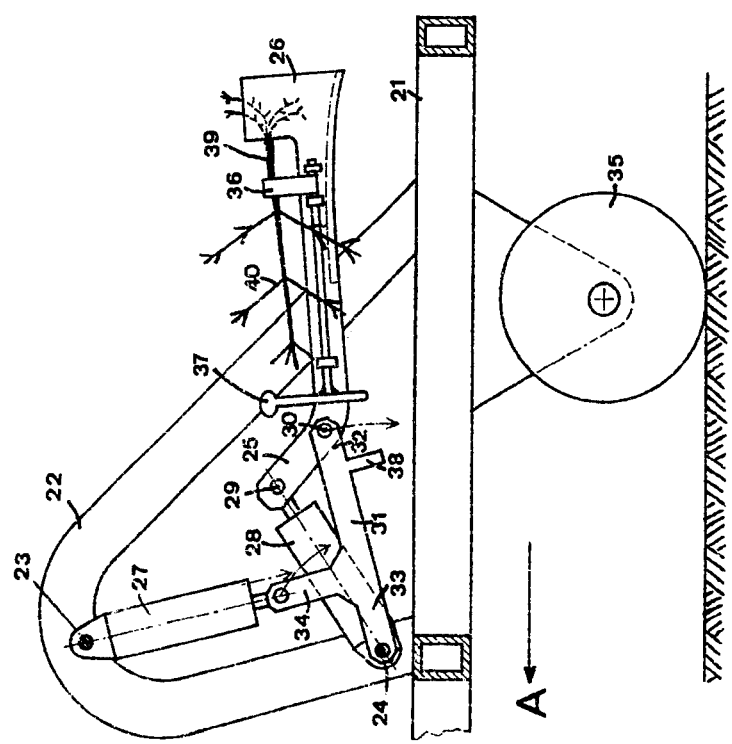

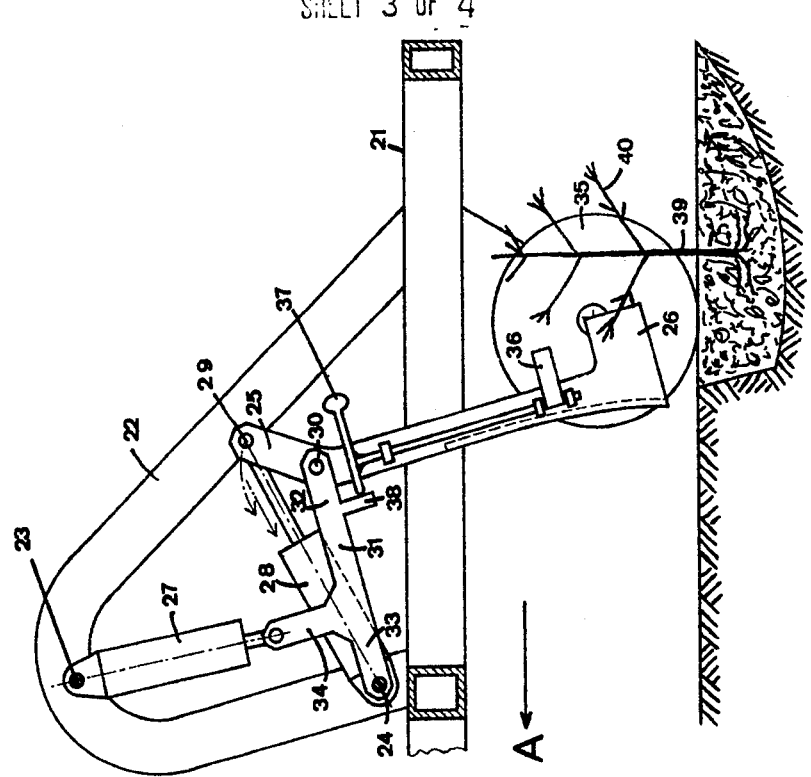
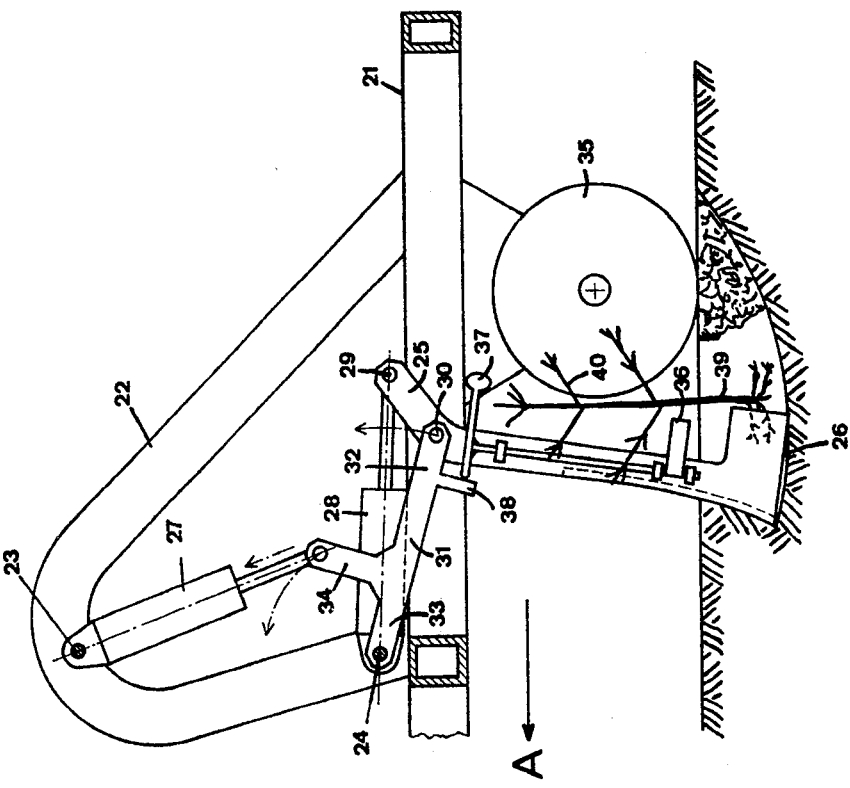

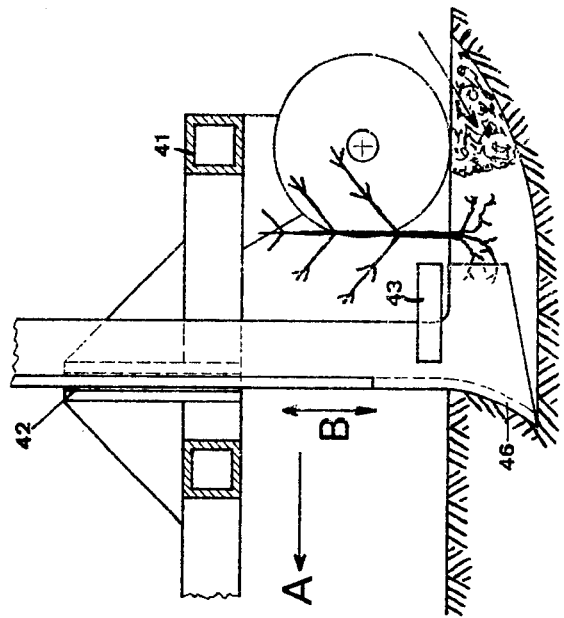
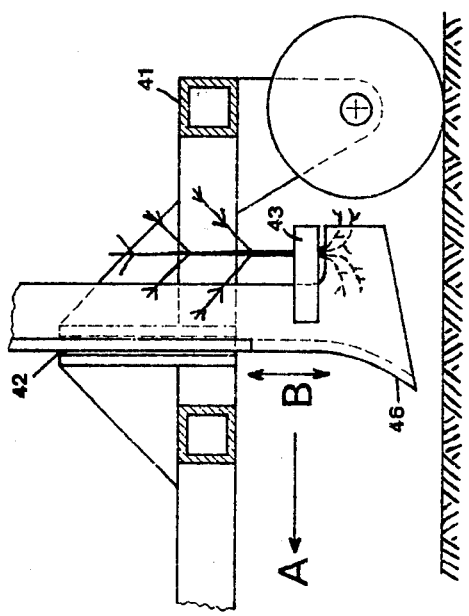

METHOD AND APPARATUS FOR PLANTING PLANTS

The present invention relates to a method and apparatus for planting plants, particularly trees.

Usually, plants are planted in furrows dug by a vertically adjustable harrow or plow. An operator riding along takes individual plants out of boxes placed within reach of the operator, and places the roots of the plant into the furrow wherein he holds the plant until oblique pressure rolls press the roots into the soil. It has also been proposed to deliver the individual plants automatically to the furrow. This, however, is possible only in relatively flat fields wherein relatively long furrows may be dug in a straight line.

German Pat. No. 491,638 proposes a planting method wherein a soil-penetrating tool carrying the plant roots is introduced into the soil in a direction perpendicular to the surface of the soil. The plant roots are separated from the tool in a position below the surface of the soil, and the tool is then moved vertically out of the soil. In this method, the tool bores a hole in the ground and the plant roots are planted in this hole.

Such a method cannot be used for plants with flat or horizontally extending roots, such as fir trees, or when the ground is hard and laced with plant growth. Furthermore, the hole dug by the tool in this method must be closed after planting in a subsequent operation.

Therefore, the usual method for planting in an area full of trees and/or other plant growth is to bore individual holes in the ground and to set the plants individually in each hole.

It is the primary object of this invention to overcome the disadvantages of prior art methods and apparatus, and to facilitate planting in difficult terrain which may be partially covered by trees or stumps.

The above and other objects are accomplished in accordance with the invention by introducing a soil-penetrating tool carrying the plant roots at an oblique angle into the soil, moving the tool with the plant roots below the surface of the soil into a position wherein the plant roots are separated from the tool, separating the plant roots from the tool in this position, and moving the tool out of the soil. Preferably, the tool is introduced into, and moved out of, the soil in an arcuate, such as a circular, path.

The apparatus of the present invention comprises a soil-penetrating tool including releasable clamping means for carrying the plant roots, means for introducing the tool carrying the plant roots at an oblique angle into the soil, for moving the tool with the plant roots below the surface of the soil into a position wherein the plant roots are separated from the tool, and for moving the tool out of the soil, and means for releasing the clamping means in this position for separating the plant roots from the tool. Preferably, the clamping means is arranged for release in the lowest position of the tool in the soil.

The above and other objects, advantages and features of this invention will become more apparent from the following detailed description of a now preferred embodiment of an apparatus according to the invention, taken in conjunction with the accompanying drawing wherein FIG. 1 is a side elevational view of one embodiment of the apparatus;

FIG. 3a is a side elevational view of another embodiment of the apparatus;

FIG. 3b to 3d show the apparatus of FIG. 3a in different working positions of the soil-penetrating tool;

FIG. 4a is a side elevational view of yet another embodiment; and

FIG. 4b shows the apparatus of FIG. 4a, with the soil-penetrating tool in lowered position.

Figure 1:
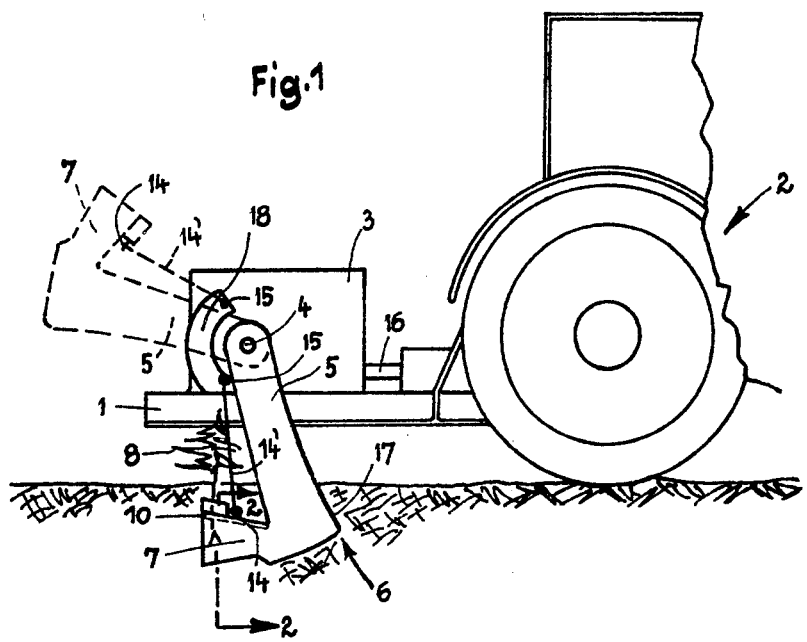

Referring now to the drawing, a half-track or other suitable vehicle 2 is shown to include platform 1 carrying gear box 3 whence there extends stub shaft 4 which is arranged to be rotated by a suitable drive operating the gears in the box, drive shaft 16 connecting the gears to the motor of the vehicle (not shown). Elongated guide element 5 is keyed to shaft 4 for rotation therewith about the shaft, the guide element carrying and guiding the soil-penetrating tool 6 in a circular path from an upper position shown in broken lines to its lowest position below the surface of the soil, shown in full lines.

Figure 2:
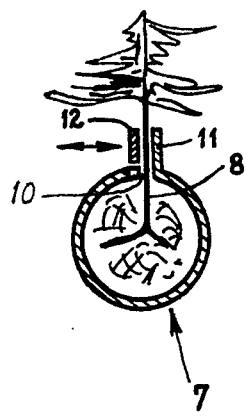
FIG. 2 is a transverse section along line 2—2 of FIG. 1, on an enlarged scale.

The leading side of tool 6 has cutting edge 17 to enable the tool to cut into the soil and to be introduced thereinto at an oblique angle as the elongated guide element is rotated counter-clockwise. The trailing side of the tool has a frusto-conical casing 7 defining a chamber carrying plant roots 8. The casing defines longitudinal slot 10 arranged to receive the trunk or stem of the plant. Lugs or flanges 11, 12 are arranged adjacent the slot edges for clamping the plant in position so that it may be carried by tool 6 during the movement thereof into the soil. As shown in FIG. 2, flange 11 is fixedly mounted on, or integral with, casing 7 while flange 12 is pivotal towards and away from flange 11. The pivotal flange is mounted at one end of linkage 14, 14' whose other end is connected to hand lever 15 for pivoting flange 12 whereby flanges 11 and 12 constitute a releasable clamping means. The hand lever is guided in arcuate guide 18 mounted on gear box 3.

The above-described implement operates as follows:

While tool 6 is in its raised position outside the soil (shown in broken lines), flange 12 is pivoted into the released position and the stem or trunk of the plant is moved along slot 10 into the frusto-conical casing so that roots 8 come to be carried therein. Flange 12 is then pivoted into the clamping position whereby the plant is held in the tool. Shaft 4 is now rotated so that the soil-penetrating tool carrying the plant roots is introduced into the soil at an oblique angle. When the tool has been moved into a position wherein the plant roots are to be separated from the tool, i.e. when the stem or trunk of the plant stands more or less vertical in respect of the surface of the soil, flange 12 is pivoted to release the stem. The plant roots and the lowest part of the stem are now partially, i.e. on three sides, surrounded by soil and will thus be retained therein and separated from the tool when the same is moved back out of the soil with casing 7 empty, the clamping means 11, 12 having been released.

Release of the clamping means may be effected in any suitable manner. For instance, flange 12 may be spring-biased and automatically pivoted outwardly under the spring bias when the handle lever 12 reaches the lowest portion of arcuate giude 18 and is released. However, the clamping means may also be electromagnetically operated.

After the plant has been planted in the described manner, it will be useful to tamp the soil over the roots by pressure rolls or vibrators.

It is possible, of course, to arrange a series of spaced apart soil-penetrating tools 6 along shaft 4 for planting rows of plants.

The planting tool or tools may be operated while the platform 1 stands still or while it advances so that the apparatus may be adapted to different terrains.

The drive for the tool or tools is preferably intermittent so that each arcuate planting movement is interrupted by a short pause during which the next plant is positioned in the open casing of the tool. If desired, the individual plants may be automatically and continuously delivered to the tool or tools.

In the embodiment of FIG. 3a, the soil-penetrating tool or implement 26 is pneumatically inserted into the soil. The illustrated apparatus comprises a platform 21 supporting frame 22 and carrying a pair of rotatable pressure rolls 35 (only one roll being shown), the entire apparatus being pulled by any suitable vehicle (not shown) in the direction of arrow A.

Pneumatic jacks 27 and 28 are linked to frame 22 at pivots 23 and 24, respectively. The soil penetrating implement has an extension 25 enclosing an obtuse angle with the implement. One end of jack 28, whose other end is linked to pivot 24, is linked to extension 25 at pivot 29. A T-shaped lever interconnects jack 27 and extension 25, arm 31 of the lever being linked to the extension at pivot 30, lever arm 33 being linked to frame 22 at pivot 34, and lever arm 34 being linked to one end of jack 27 whose other end is pivoted to the frame at 23. As in the first-described embodiment, the roots of plant 40 are received in a chamber at the end of the soil-penetrating tool while the trunk or stem 39 of the plant is held in position by clamp 36 which may be opened or closed by operating handle 37 to rotate the clamp into and out of a closing position embracing the stem.

The operation of this apparatus will be apparent from the successive stages illustrated in FIGS. 3a to 3d. Beginning with its starting or rest position shown in FIG. 3a, pressure fluid is supplied to jack 27 (FIG. 3b) to extend its piston rod and thereby to begin the first stroke of lowering implement 26. When it reaches the position shown in FIG. 3b, jack 28 is operated to extend its piston, as shown in FIG. 3c, until soil-penetrating tool 26 has reached a substantially upright position. In this position, a lug 38 on lever arm 31 will rotate handle lever 37 so as to open clamp 36 to release stem 39 of the plant. The plant may now be removed from implement 26 and the roots set in the soil in the illustrated manner. As shown in FIG. 3d, jack 27 is now operated to retract its piston, while the piston of jack 28 remains extended, to lift the empty soil-penetrating tool out of the ground while the apparatus is pulled forward in the direction of arrow A to cause the pressure rolls 35 to press down the soil over the planted roots on either side of stem 39.

In the embodiment of FIGS. 4a and 4b, soil-penetrating tool 46 is carried on platform 41 in a vertical guide 42 to be reciprocated vertically. The drive for reciprocating the tool may be a rack-and-pinion mechanism or a pneumatic jack. In this embodiment, the soil-penetrating tool carrying the plant roots is introduced into the soil at an oblique angle (see FIG. 4b) by advancing the apparatus in the direction of arrow A while the tool is lowered in the direction of arrow B. Clamp 43 is then opened to release the plant, the tool is lifted after the plant has been released, and the pressure rolls again press down the soil around the plant.

Unless otherwise described and/or illustrated, individual structures are the same in all three embodiments.

What is claimed is:

1. An apparatus for planting a plant having roots, comprising
   1. a soil-penetrating tool,
   2. a releasable clamping means for carrying the plant roots, the clamping means being mounted on the tool,
   3. means operatively connected to the tool for introducing the tool carrying the plant roots into the soil, for moving the tool with the plant roots below the surface of the soil into a position wherein the plant roots are separated from the tool, and for moving the tool out of the soil, and
   4. means operatively connected to the clamping means for releasing the clamping means in said position for separating the plants roots from the tool.

2. The apparatus of claim 1, wherein the tool introducing means is arranged to introduce the tool into the soil at an oblique angle.

3. The apparatus of claim 1, wherein the means for introducing and moving the tool comprises an elongated guide element for guiding the tool in a circular path, and a driven shaft mounting the guide element for rotation about the shaft.

4. The apparatus of claim 1, further comprising an elongated extension on the soil-penetrating tool, and the means for introducing the tool into the soil and for moving the tool comprises pneumatic jack means and a linkage linking the jack means to the tool extension, the linkage being arranged to guide the tool in a circular path for introducing the tool into the soil.

5. The apparatus of claim 1, wherein the means for introducing the tool into the soil and for moving the tool comprises means for substantially vertically reciprocating the tool and means operated simultaneously with the reciprocating means for horizontally moving the tool.

6. The apparatus of claim 1, wherein the soil-penetrating tool comprises a frusto-conical casing defining a chamber open at the trailing side of the tool, a cutting edge at the leading side thereof, and the casing defining a longitudinal slot arranged to receive the trunk of a plant whose roots are received in the chamber.

7. The apparatus of claim 6, wherein the clamping means is arranged along the slot for releasably clamping the plant trunk.

8. The apparatus of claim 7, wherein the clamping means comprises a first flange extending along the slot and fixedly mounted on the casing and a second flange extending along the slot opposite the first slot and being pivotal in respect thereto.

9. The apparatus of claim 8, further comprising a linkage having one end connected to the pivotal flange, and a guide operatively associated with the other end of the linkage for guiding the other linkage end during the movement of the tool.

* * * * *